May 18, 1943. M. P. JANISCH 2,319,686

ARTIFICIAL BAIT

Filed June 9, 1941

Maximillian P. Janisch
INVENTOR.

BY Ralph Brown
ATTORNEY.

Patented May 18, 1943

2,319,686

UNITED STATES PATENT OFFICE 2,319,686

ARTIFICIAL BAIT

Maximillian P. Janisch, Milwaukee, Wis.

Application June 9, 1941, Serial No. 397,178

2 Claims. (Cl. 43—39)

This invention relates to artificial baits or fish lures.

An object of the present invention is to provide a new and improved artificial bait of the spoon type having a weedless hook.

Another object is to provide an improved means for effectively preventing a fish hook from catching on weeds, logs, or other obstructions in the water.

Other more specific objects and advantages will appear from the following description of an artificial bait constructed in accordance with the present invention.

Figure 1:
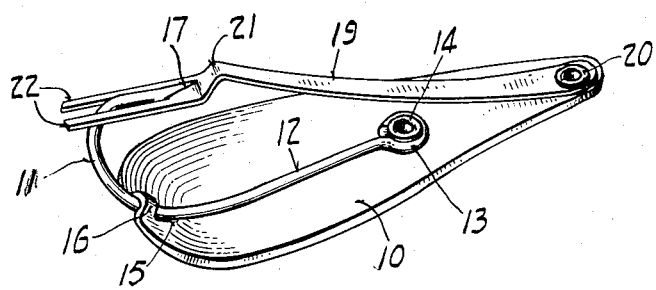
Figure 1 is a perspective view of an artificial bait embodying the present invention.
Figure 2:
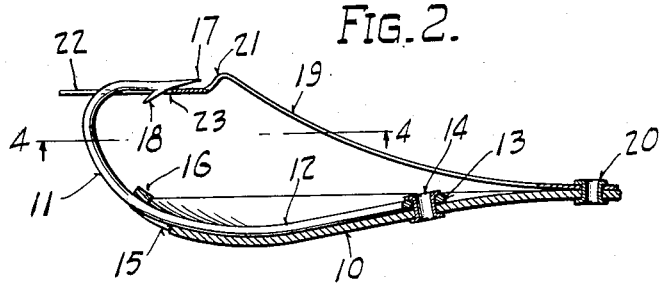
Fig. 2 is a longitudinal sectional view.
Figure 3:
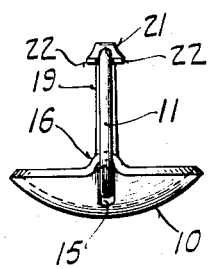
Fig. 3 is a rear end view.
Figure 4:
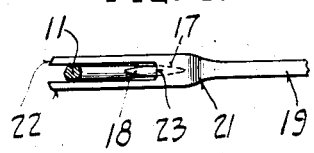
Fig. 4 is a sectional view taken substantially along the line 4—4 of Fig. 2.

The artificial bait selected for illustration comprises a spoon type metal body portion 10 of conventional contour having a single hook 11 rigidly attached thereto.

In this instance the shank 12 of the hook extends lengthwise of the body portion midway between the side edges thereof and is provided at its end with an eye 13 fixed against the concave face of the body portion by appropriate means, such as an eyelet or rivet 14. The shank 12 extends rearwardly beyond the body portion through an opening 15 therein and beneath an integral strap 16 which provides additional anchorage therefor.

The hook is preferably so disposed that the point 17 and barb 18 thereof are spaced a maximum distance from the concave face of the body portion at the rear thereof and substantially equidistant from the side edges of the body portion. The point of the hook is thus in most effective fish engaging position. The shank 12 of the hook is preferably fashioned to closely follow the contour of the body position so as to afford minimum lodgement for weeds and the like.

The hook is rendered weedless by a guard of novel construction which will now be described. The guard shown comprises a length 19 of resilient material, such for instance as Swedish spring steel, securely fixed at one end by suitable means, such as an eyelet 20 anchored in the forward end of the body portion 10. Incidentally the eyelet 20 provides a convenient means for attaching a fish line to the body portion. The guard 19 extends rearwardly toward the point 17 of the hook and is preferably bent to provide a protective shoulder 21 immediately in advance of the point.

Rearwardly of the shoulder 21 the guard is fashioned to coact with the hook in such manner as to resist lateral displacement of the shoulder 21 from its normal point protecting position and yet permit the shoulder 21 to be depressed to expose the point of the hook when struck by a fish. Although this may be accomplished in various ways, the guard formation shown has proven satisfactory. In this instance the rear end of the guard is slotted to provide two rearwardly extended guide fingers 22 disposed at opposite sides of the body of the hook and coacting therewith to retain the guard against lateral displacement. Also the base 23 of the slot is adapted to bear against the under side of the pointed end of the hook to further resist lateral displacement of the guard and to accurately position the shoulder 21 in front of the point 17, the base of the slot being yieldably retained in that position by the resilient tension in the body of the guard.

It will of course be understood that the guard is normally in position to protect the point of the hook from weeds, logs and other obstructions, during forward advance of the lure at normal speed, but that it is readily depressed under the bite of a fish to expose the point to the fish. It will also be noted that the fingers 22 are of such length as to provide a guide for the guard in all depressed positions thereof The body of the guard 19 is sufficiently flexible so that it may be bowed in a manner to permit disengagement and re-engagement of the slotted portion thereof from and with the hook. This is advantageous particularly when it is desired to attach strips of bacon rind or other lures to the hook. When thus disengaged, the body of the guard may be bent in one direction or the other to increase or decrease the resilient tension therein and thereby increase or decrease at will the outward pressure thereof against the under side of the pointed end of the hook, thereby to better adapt the same for use in light or heavy weeds.

Various change may be made in the embodiment of the invention hereinabove specifically described without departing from or sacrificing the advantages of the invention as defined in the appended claims.

I claim:

1. An artificial bait comprising a spoon like body portion, a fish hook carried thereby, said hook having a forwardly projecting point offset from said body portion adjacent the rear thereof, and a depressable weed guard having one end attached to said body portion and another portion normally disposed adjacent said point to protect the latter from weeds and the like, said last named portion having guide fingers longitudinally extended into coacting relation with the body of said hook to prevent lateral displacement thereof relative to said hook when said last named portion is depressed from said point.

2. In an artificial bait the combination of a fish hook having a forwardly directed point, a depressable weed guard having a shoulder portion normally disposed immediately in advance of said point to protect the same from weeds and the like, and a slotted portion at the end of said guard longitudinally extended into coacting relation with the body of said hook to prevent lateral displacement thereof relative to said hook when said guard is depressed from said point.

MAXIMILLIAN P. JANISCH.